(12) United States Patent
Sjouwerman et al.

(10) Patent No.: US 12,519,806 B2
(45) Date of Patent: Jan. 6, 2026

(54) SYSTEMS AND METHODS FOR DETERMINATION OF INDICATORS OF MALICIOUS ELEMENTS WITHIN MESSAGES

(71) Applicant: KnowBe4, Inc., Clearwater, FL (US)

(72) Inventors: Stu Sjouwerman, Bellair, FL (US); Greg Kras, Dunedin, FL (US)

(73) Assignee: Knowbe4, Inc., FL (US)

(*) Notice: Subject to any disclaimer, the term of this patent is extended or adjusted under 35 U.S.C. 154(b) by 926 days.

(21) Appl. No.: 17/729,938

(22) Filed: Apr. 26, 2022

(65) Prior Publication Data
US 2022/0353279 A1     Nov. 3, 2022

Related U.S. Application Data

(60) Provisional application No. 63/181,573, filed on Apr. 29, 2021.

(51) Int. Cl.
*H04L 9/40*     (2022.01)

(52) U.S. Cl.
CPC ...... *H04L 63/1416* (2013.01); *H04L 63/1433* (2013.01)

(58) Field of Classification Search
CPC ............. H04L 63/1416; H04L 63/1433; H04L 63/0227
See application file for complete search history.

(56) References Cited

U.S. PATENT DOCUMENTS

| 6,088,804 | A | * | 7/2000 | Hill | G06F 21/554 726/25 |
| 6,119,236 | A | * | 9/2000 | Shipley | H04L 63/02 713/153 |
| 6,321,338 | B1 | * | 11/2001 | Porras | H04L 63/1416 709/224 |
| 7,594,270 | B2 | * | 9/2009 | Church | H04L 63/1416 726/23 |
| 7,949,716 | B2 | * | 5/2011 | Alperovitch | H04L 51/212 709/219 |
| 8,578,480 | B2 | * | 11/2013 | Judge | H04L 63/1466 713/192 |
| 8,615,807 | B1 | | 12/2013 | Higbee et al. | |
| 8,635,703 | B1 | | 1/2014 | Belani et al. | |

(Continued)

FOREIGN PATENT DOCUMENTS

| EP | 3 582 468 A1 | 12/2019 |
| WO | WO-2016/164844 A1 | 10/2016 |

*Primary Examiner* — David Garcia Cervetti
(74) *Attorney, Agent, or Firm* — Foley & Lardner LLP

(57) ABSTRACT

Systems and methods are described for determination of indicators of malicious elements within messages. A report of a malicious message is received from a user of an organization, the malicious message having traversed an endpoint security system of the organization. After receiving the report of the malicious message, one or more indicators of one or more malicious elements of the malicious message are identified. Further, an identification of the endpoint security system and a dangerousness score of the malicious message are determined. The one or more indicators, the identification of the endpoint security system, and the dangerousness score are stored into a threat database that is able to be queried to generate an endpoint-specific threat data set.

20 Claims, 8 Drawing Sheets

400

(56) References Cited

U.S. PATENT DOCUMENTS

| | | | |
|---|---|---|---|
| 8,719,940 B1 | 5/2014 | Higbee et al. | |
| 8,813,236 B1* | 8/2014 | Saha | H04L 63/1408 726/25 |
| 8,910,287 B1 | 12/2014 | Belani et al. | |
| 8,966,637 B2 | 2/2015 | Belani et al. | |
| 9,047,441 B2* | 6/2015 | Xie | G06F 21/53 |
| 9,053,326 B2 | 6/2015 | Higbee et al. | |
| 9,060,024 B2* | 6/2015 | Patel | H04L 41/069 |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,363,280 B1* | 6/2016 | Rivlin | H04L 63/1441 |
| 9,392,003 B2* | 7/2016 | Amsler | H04L 63/1408 |
| 9,398,038 B2 | 7/2016 | Higbee et al. | |
| 9,571,512 B2* | 2/2017 | Ray | H04L 63/1425 |
| 9,591,017 B1 | 3/2017 | Higbee et al. | |
| 9,596,266 B1* | 3/2017 | Coleman | G06F 21/53 |
| 9,609,011 B2* | 3/2017 | Muddu | H04L 41/0893 |
| 9,641,550 B2* | 5/2017 | Kraitsman | H04L 63/1433 |
| 9,661,017 B2* | 5/2017 | Alperovitch | G06F 16/148 |
| 9,667,645 B1 | 5/2017 | Belani et al. | |
| 9,774,626 B1* | 9/2017 | Himler | H04L 63/1483 |
| 9,912,687 B1 | 3/2018 | Wescoe et al. | |
| 9,967,264 B2* | 5/2018 | Harris | H04L 63/1416 |
| 10,122,748 B1* | 11/2018 | Currie | H04L 63/1433 |
| 10,129,270 B2* | 11/2018 | Doctor | H04L 63/1408 |
| 10,158,677 B1* | 12/2018 | DiCorpo | H04L 63/145 |
| 10,185,465 B1* | 1/2019 | Capano | G06F 21/552 |
| 10,218,697 B2* | 2/2019 | Cockerill | H04L 63/0823 |
| 10,341,377 B1* | 7/2019 | Dell'Amico | H04L 63/1416 |
| 10,419,458 B2* | 9/2019 | Moscovici | H04W 12/122 |
| 10,511,621 B1* | 12/2019 | Thomson | H04L 63/1441 |
| 10,721,252 B2* | 7/2020 | Murphy | H04L 63/164 |
| 10,904,186 B1 | 1/2021 | Everton et al. | |
| 10,924,503 B1* | 2/2021 | Pereira | H04L 63/20 |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,252,168 B2* | 2/2022 | Mehta | H04L 63/1425 |
| 11,297,094 B2 | 4/2022 | Huda | |
| 11,528,295 B2* | 12/2022 | Meriot | G06F 21/562 |
| 11,595,437 B1* | 2/2023 | Mushtaq | H04L 63/20 |
| 11,677,786 B1* | 6/2023 | Vashisht | H04L 63/1433 726/22 |
| 11,711,381 B2* | 7/2023 | Muthuswamy | H04L 63/1416 726/23 |
| 11,856,009 B2* | 12/2023 | Mishra | H04L 63/1416 |
| 11,915,178 B2* | 2/2024 | Carpenter | G06Q 10/06395 |
| 11,936,688 B2* | 3/2024 | Irimie | H04L 63/1433 |
| 11,997,115 B1* | 5/2024 | Higbee | G06F 16/35 |
| 2002/0087882 A1* | 7/2002 | Schneier | H04L 63/20 709/224 |
| 2009/0089859 A1* | 4/2009 | Cook | H04L 63/1441 726/3 |
| 2009/0276843 A1* | 11/2009 | Patel | H04L 63/20 726/13 |
| 2011/0061089 A1* | 3/2011 | O'Sullivan | H04L 63/102 726/1 |
| 2011/0138471 A1* | 6/2011 | Van De Weyer | H04L 63/1433 726/25 |
| 2012/0060207 A1* | 3/2012 | Mardikar | H04L 63/20 726/4 |
| 2012/0066759 A1* | 3/2012 | Chen | G06F 21/554 726/15 |
| 2013/0333028 A1* | 12/2013 | Hagar | H04L 63/1483 726/22 |
| 2014/0007238 A1* | 1/2014 | Magee | G06F 21/577 726/24 |
| 2014/0380456 A1* | 12/2014 | Demopoulos | H04L 63/1458 726/22 |
| 2015/0261951 A1* | 9/2015 | Abuelsaad | G06F 21/52 726/22 |
| 2016/0006749 A1* | 1/2016 | Cohen | G06Q 40/12 726/23 |
| 2016/0164898 A1 | 6/2016 | Belani et al. | |
| 2016/0164917 A1* | 6/2016 | Friedrichs | G06F 21/554 |
| 2016/0301705 A1* | 10/2016 | Higbee | H04L 51/42 |
| 2016/0337384 A1* | 11/2016 | Jansson | H04L 65/1045 |
| 2016/0344758 A1* | 11/2016 | Cohen | H04L 63/145 |
| 2016/0350531 A1* | 12/2016 | Harris | H04L 63/20 |
| 2017/0171231 A1* | 6/2017 | Reybok, Jr. | H04L 63/1433 |
| 2017/0180396 A1* | 6/2017 | Finnig | H04L 63/1408 |
| 2017/0289179 A1* | 10/2017 | Dubuc | G06F 21/51 |
| 2017/0353484 A1* | 12/2017 | Knapp | H04L 63/1416 |
| 2018/0004942 A1* | 1/2018 | Martin | G06F 21/554 |
| 2018/0046799 A1* | 2/2018 | Kohavi | G06F 21/53 |
| 2018/0124090 A1* | 5/2018 | Koren | H04L 63/1416 |
| 2018/0124098 A1* | 5/2018 | Carver | G06N 20/00 |
| 2018/0191754 A1* | 7/2018 | Higbee | H04L 63/1416 |
| 2019/0068632 A1* | 2/2019 | Foster | H04L 63/1433 |
| 2019/0173819 A1 | 6/2019 | Wescoe et al. | |
| 2019/0245885 A1 | 8/2019 | Starink et al. | |
| 2020/0074078 A1* | 3/2020 | Saxe | G06F 11/079 |
| 2020/0311260 A1 | 10/2020 | Klonowski et al. | |
| 2020/0366712 A1* | 11/2020 | Onut | H04L 63/1483 |
| 2021/0051162 A1* | 2/2021 | Taylor | G06N 20/00 |
| 2021/0058428 A1* | 2/2021 | Arlitt | H04L 63/1416 |
| 2021/0075827 A1 | 3/2021 | Grealish | |
| 2021/0136089 A1* | 5/2021 | Costea | H04L 51/212 |
| 2021/0168161 A1* | 6/2021 | Dunn | H04L 51/212 |
| 2021/0185075 A1 | 6/2021 | Adams | |
| 2021/0194924 A1 | 6/2021 | Heinemeyer et al. | |
| 2021/0200870 A1* | 7/2021 | Yavo | H04L 63/1416 |
| 2021/0243204 A1* | 8/2021 | Taylor | H04L 63/1408 |
| 2021/0250369 A1* | 8/2021 | Åvist | G06F 21/552 |
| 2021/0407308 A1 | 12/2021 | Brubaker et al. | |
| 2022/0005373 A1 | 1/2022 | Nelson et al. | |
| 2022/0006830 A1 | 1/2022 | Wescoe | |
| 2022/0078207 A1 | 3/2022 | Chang et al. | |
| 2022/0094702 A1 | 3/2022 | Saad Ahmed et al. | |
| 2022/0100332 A1* | 3/2022 | Haworth | G06F 3/04817 |
| 2022/0109681 A1* | 4/2022 | Hamdi | H04L 43/0817 |
| 2022/0116419 A1 | 4/2022 | Kelm et al. | |
| 2022/0130274 A1 | 4/2022 | Krishna Raju et al. | |
| 2022/0207140 A1* | 6/2022 | Mooney, III | G06F 21/577 |
| 2022/0210168 A1* | 6/2022 | Yavo | H04L 63/1433 |
| 2022/0210190 A1* | 6/2022 | Weber | G06N 20/20 |
| 2022/0255961 A1* | 8/2022 | Reiser | G06Q 10/107 |
| 2022/0286419 A1 | 9/2022 | Stetzer et al. | |
| 2024/0089273 A1* | 3/2024 | Aslaner | H04L 63/1416 |
| 2025/0030716 A1* | 1/2025 | Cross | H04L 63/20 |
| 2025/0036756 A1* | 1/2025 | Cotiga | H04L 63/1425 |

\* cited by examiner

SYSTEMS AND METHODS FOR DETERMINATION OF INDICATORS OF MALICIOUS ELEMENTS WITHIN MESSAGES

RELATED APPLICATIONS

This patent application claims the benefit of and priority to U.S. Provisional Patent Application No. 63/181,573 titled "SYSTEMS AND METHODS FOR DETERMINATION OF INDICATORS OF MALICIOUS ELEMENTS WITHIN MESSAGES," and filed Apr. 29, 2021, the contents of all of which are hereby incorporated herein by reference in its entirety for all purposes

TECHNICAL FIELD

The present disclosure relates to systems and methods for determination of malicious elements within messages. In particular, the present disclosure relates to determination of indicators of malicious elements within email messages.

BACKGROUND

Cybersecurity incidents such as phishing attacks may cost organizations in terms of loss of confidential and/or important information, and expenses in mitigating losses due to breach of confidential information. Such incidents can also cause customers to lose trust in the organization. The incidents of cybersecurity attacks and the costs of mitigating damages caused due to the incidents are increasing every year. Organizations invest in cybersecurity tools such as antivirus, anti-ransomware, anti-phishing, and other security platforms. Such cybersecurity tools may detect and intercept known cybersecurity attacks. Among the cybersecurity attacks, organizations have recognized phishing attacks as one of the most prominent threats that can cause serious breaches of data including confidential information such as intellectual property, financial information, organizational information, and other important information. Attackers who launch phishing attacks may evade an organization's security apparatuses and tools, and target its employees. To prevent or to reduce a success rate of cybersecurity attacks on employees, organizations may employ endpoint security systems. Known examples of endpoint security systems are CrowdStrike® Falcon, McAfee® Total Protection, and Symantec™.

With an increasing number of cybersecurity attacks, the endpoint security systems may process a plethora of cybersecurity attacks on a daily basis. Accordingly, even a small percentage of missed detections may result in a large number of cybersecurity attacks reaching their targets. Cybersecurity threats are constantly evolving as they are updated to evade the endpoint security systems. New threats, often referred to as zero-day attacks, may not be recognized by some or all endpoint security systems and may be delivered to employees within an organization in the form of malicious messages. Consequently, the organization may be at a security risk, possibly leading to breach of the organization's sensitive information if the employees were to act on the malicious messages.

SUMMARY

The present disclosure generally relates to systems and methods for determination of malicious elements within messages. In particular, the present disclosure relates to determination of indicators of malicious elements within email messages.

Systems and methods are provided for determination of indicators of malicious elements within email messages. In an example embodiment, a method is described, which includes receiving, by one or more servers, from a user of an organization a report of a malicious message, the malicious message having traversed an endpoint security system of the organization, identifying, by the one or more servers, one or more indicators of one or more malicious elements of the malicious message, determining, by the one or more servers, an identification of the endpoint security system, determining, by the one or more servers, a dangerousness score of the malicious message, and storing, by the one or more servers, the one or more indicators, the identification of the endpoint security system, and the dangerousness score into a threat database that is able to be queried to generate an endpoint-specific threat data set.

In some embodiments, the method further includes classifying, by the one or more servers, the malicious message as a threat and the classification having a level of confidence.

In some embodiments, the method further includes storing, by the one or more servers, the level of confidence with the one or more indicators, the identification of the endpoint security system, and the dangerousness score into the threat database.

In some embodiments, the method further includes determining, by the one or more servers, the identification of the endpoint security system from one or more headers of the malicious message.

In some embodiments, the method further includes determining, by the one or more servers, the identification of the endpoint security system from input received from a system administrator.

In some embodiments, the method further includes receiving, by the threat database, a query for indicators that evaded the endpoint security system and providing, by the threat database, the indicators in a format used by the endpoint security system.

In some embodiments, the method further includes receiving, by the threat database, a query for indicators with a minimum level of the dangerousness score for the endpoint security system and providing, by the threat database, the indicators meeting the minimum level of the dangerousness score for the endpoint security system.

In some embodiments, the method further includes generating from the threat database responsive to one or more queries a circulated threat data set comprising a sub-set of the threat database.

In some embodiments, the method further includes generating the circulated threat data set into the endpoint-specific threat data set having a format used by the endpoint security system.

In some embodiments, the endpoint-specific threat data set is used by one or more of the endpoint security systems to protect against malicious messages having the one or more indicators.

In another example implementation, a system is described, which includes one or more servers. The one or more servers are configured to receive from a user of an organization a report of a malicious message, the malicious message having traversed an endpoint security system of the organization, identify one or more indicators of one or more malicious elements of the malicious message, determine an identification of the endpoint security system, determine a dangerousness score of the malicious message, and store one or more indicators, the identification of the endpoint security system and the dangerousness score into a threat database that is able to be queried to generate an endpoint-specific threat data set.

Other aspects and advantages of the disclosure will become apparent from the following detailed description, taken in conjunction with the accompanying drawings, which illustrate by way of example the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For the purposes of reading the description of the various embodiments below, the following descriptions of the sections of the specifications and their respective elements may be helpful:

Section A describes a network environment and computing environment which may be useful for practicing embodiments described herein.

Section B describes embodiments of systems and methods for determination of malicious elements within messages. In particular, Section B describes determination of indicators of malicious elements within email messages.

A. Computing and Network Environment

Figure 1A:
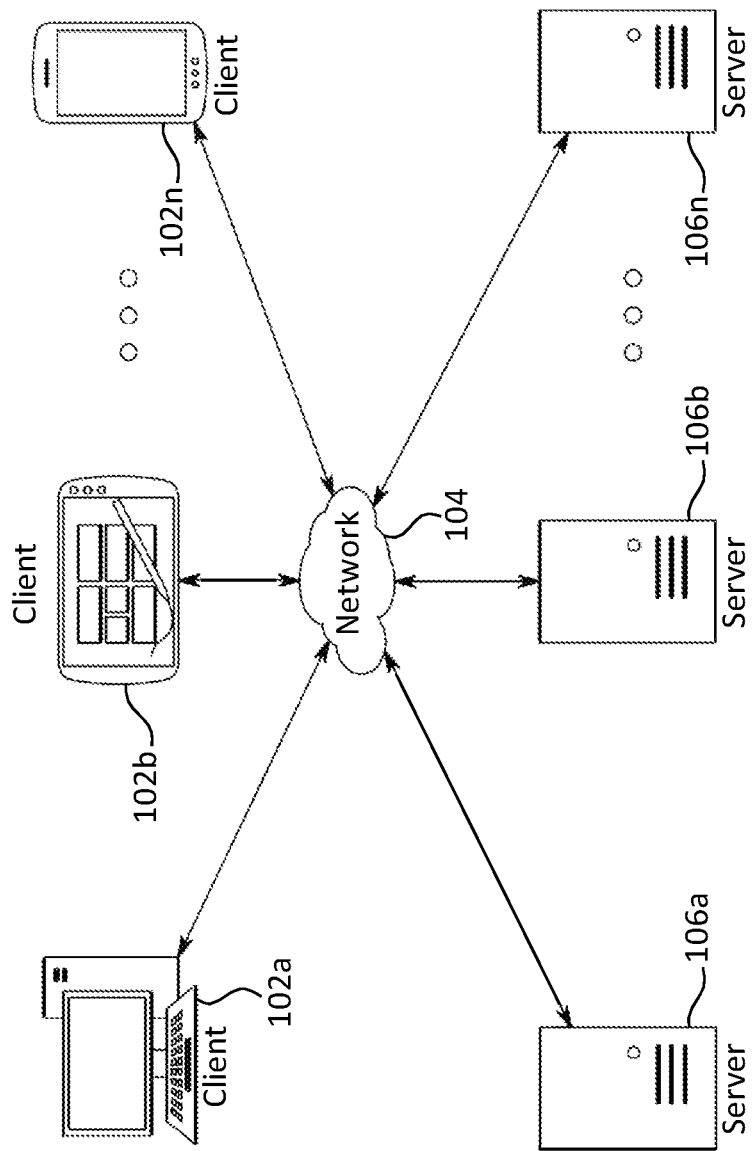
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g., Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, California.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
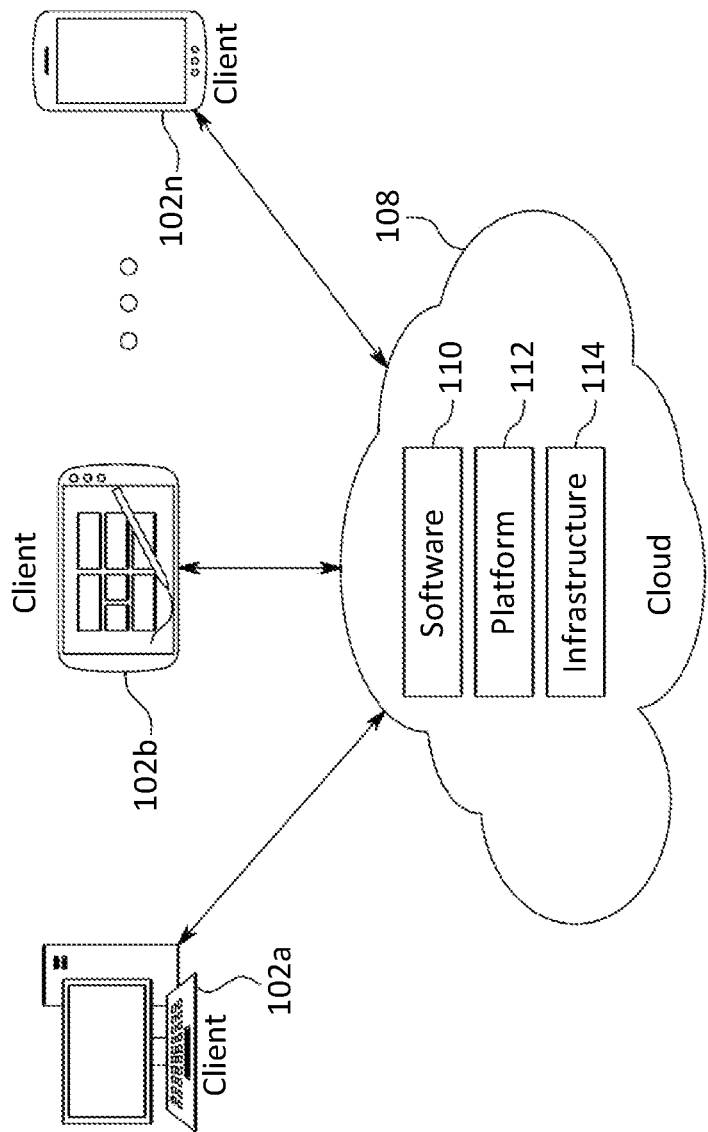
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, virtualization, or containerization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g., Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
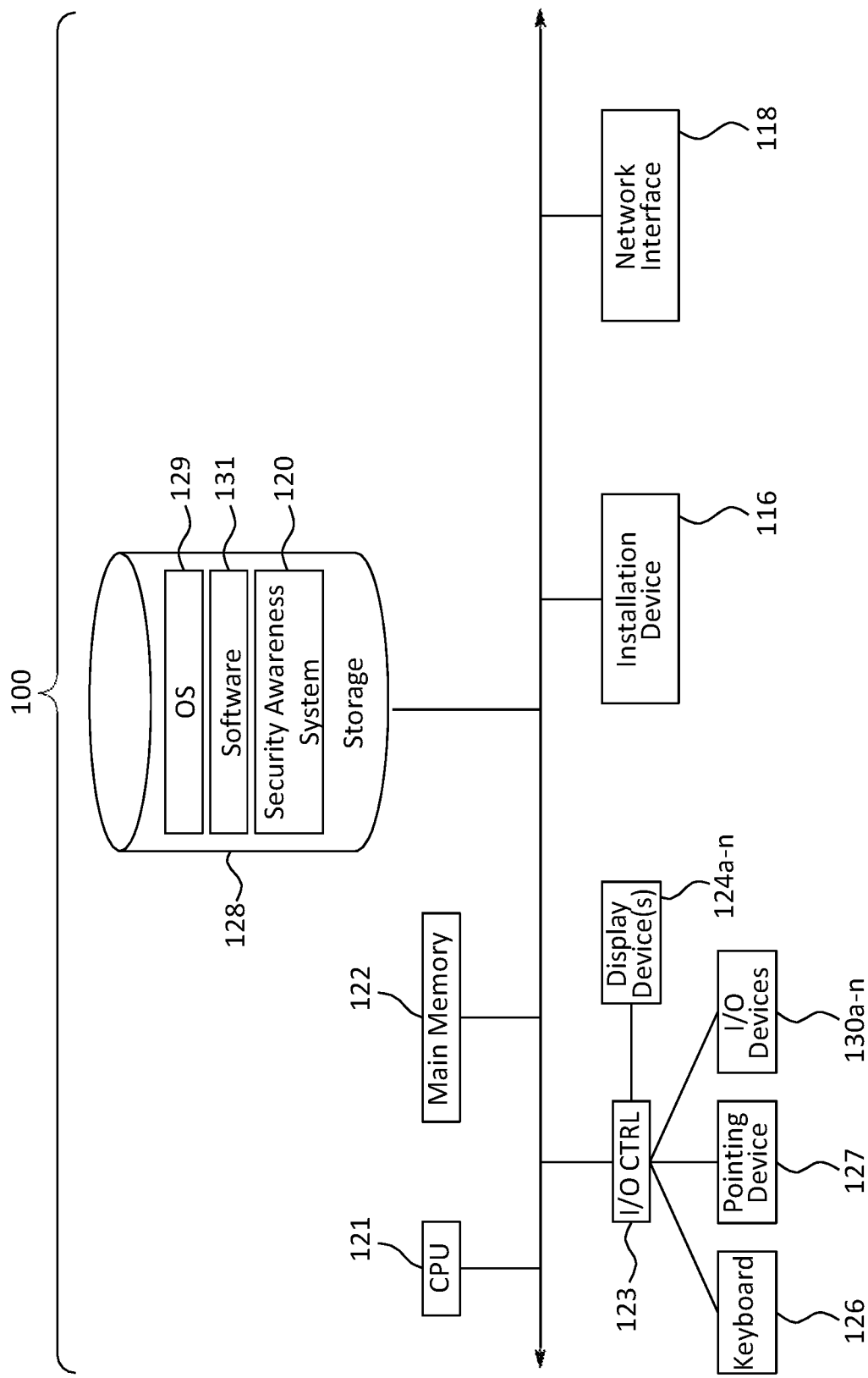
FIGS. 1C and 1D are block diagrams depicting embodiments of computing devices useful in connection with the methods and systems described herein, according to some embodiments.
Figure 1D:
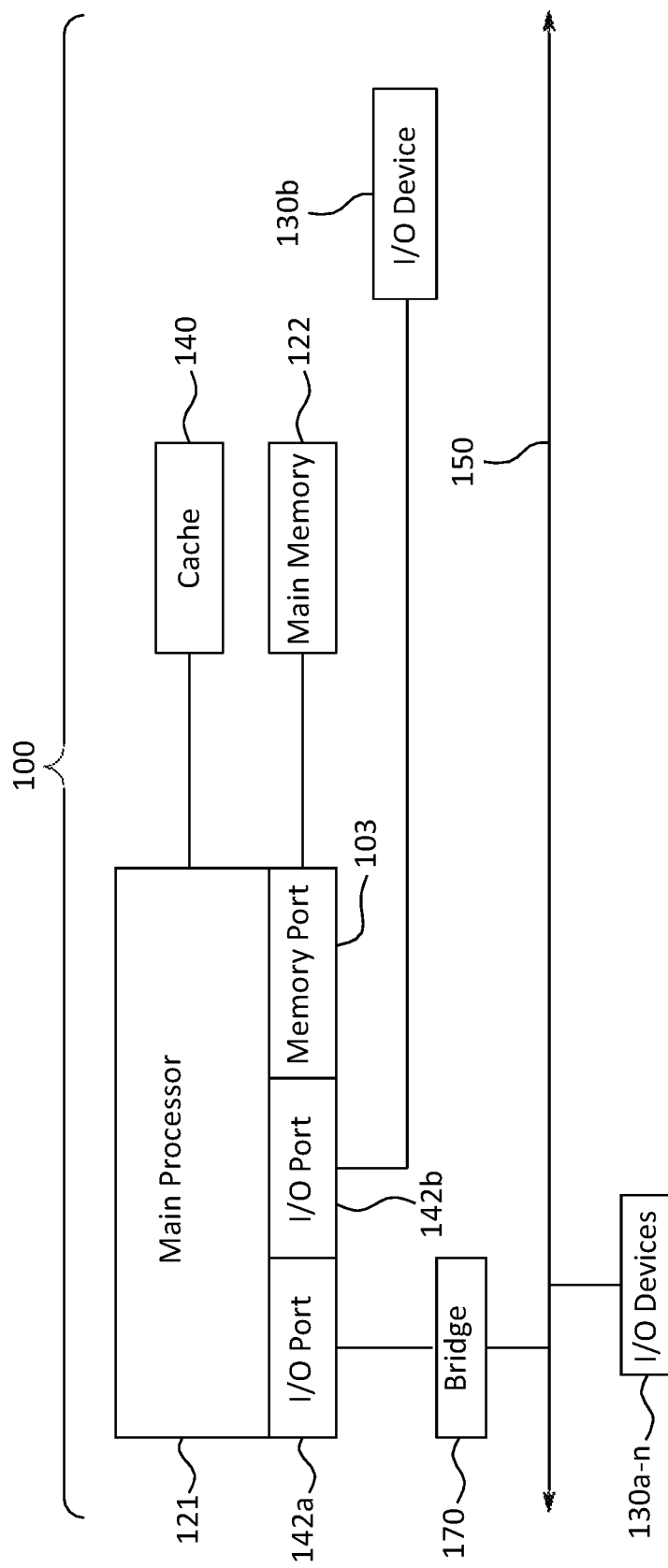

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple iPhone. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provide for voice recognition and inputs, including, e.g., Microsoft KINECT, SIRI for iPhone by Apple, Google Now or Google Voice Search, and Alexa by Amazon.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, computing device 100 may include or connect to multiple display devices 124*a*-124*n*, which each may be of the same or different type and/or form. As such, any of I/O devices 130*a*-130*n* and/or the I/O controller 123 may include any type and/or form of suitable hardware, software, or combination of hardware and software to support, enable or provide for the connection and use of multiple display devices 124*a*-124*n* by computing device 100. For example, computing device 100 may include any type and/or form of video adapter, video card, driver, and/or library to interface, communicate, connect, or otherwise use display devices 124*a*-124*n*. In one embodiment, a video adapter may include multiple connectors to interface to multiple display devices 124*a*-124*n*. In other embodiments, computing device 100 may include multiple video adapters, with each video adapter connected to one or more of display devices 124*a*-124*n*. In some embodiments, any portion of the operating system of computing device 100 may be configured for using multiple displays 124*a*-124*n*. In other embodiments, one or more of the display devices 124*a*-124*n* may be provided by one or more other computing devices 100*a* or 100*b* connected to computing device 100, via network 104. In some embodiments, software may be designed and constructed to use another computer's display device as second display device 124*a* for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124*a*-124*n*.

Referring again to FIG. 1C, computing device 100 may comprise storage device 128 (e.g., one or more hard disk drives or redundant arrays of independent disks) for storing an operating system or other related software, and for storing application software programs such as any program related to security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g., the IPAD line of devices by Apple; GALAXY TAB family of devices by Samsung; or KINDLE FIRE, by Amazon.com, Inc. of Seattle, Washington. In other embodiments, computing device 100 is an eBook reader, e.g., the KINDLE family of devices by Amazon.com, or NOOK family of devices by Barnes & Noble, Inc. of New York City, New York.

In some embodiments, communications device 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g., a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 2:
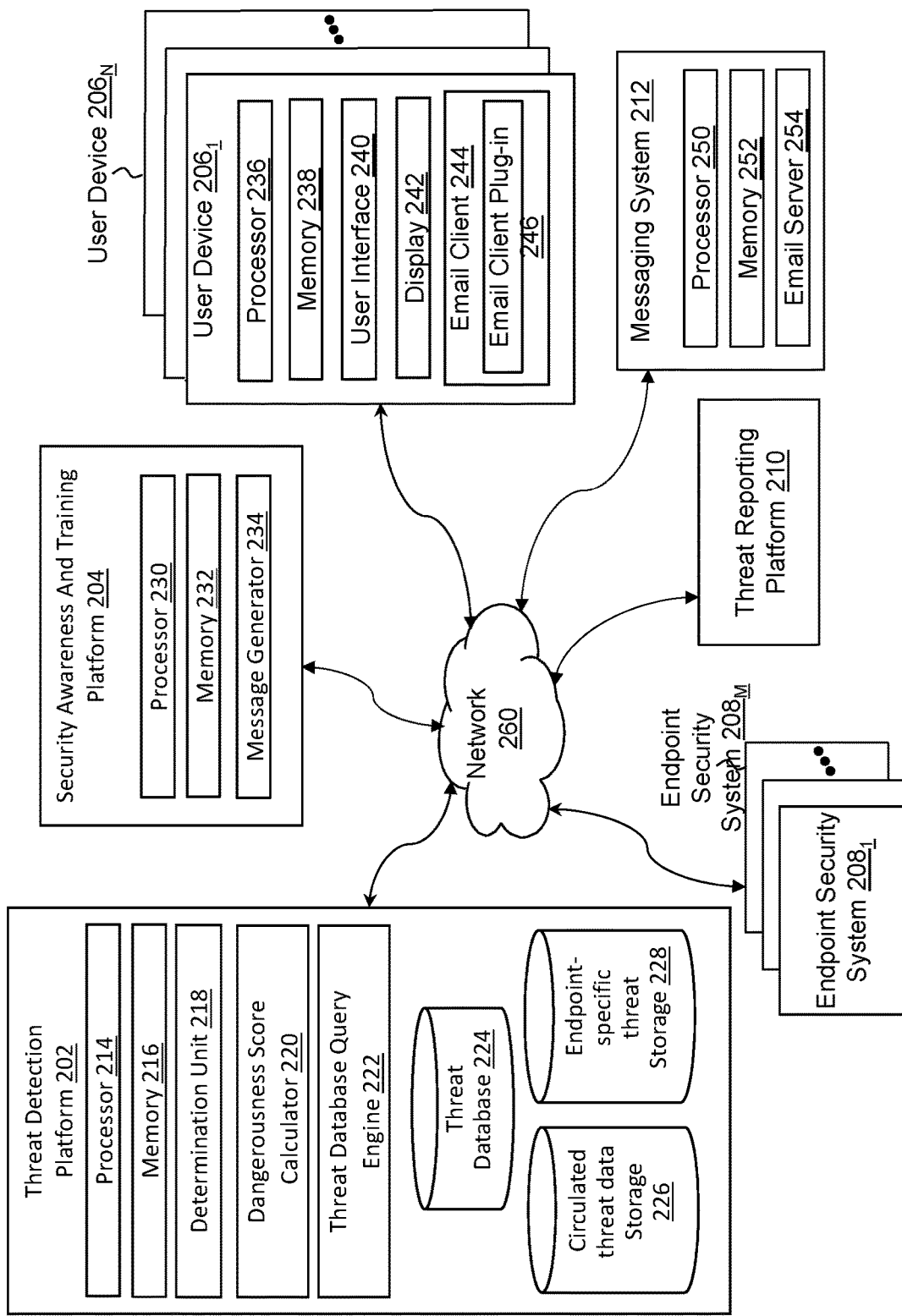
FIG. 2 depicts an implementation of some of an architecture of a system for determination of indicators of malicious elements within email messages, according to some embodiments.

B. Systems and Methods for Determination of Indicators of Malicious Elements within Messages FIG. 2 depicts an implementation of some of an architecture of system 200 for determination of indicators of malicious elements within email messages, according to some embodiments.

System 200 may be a part of security awareness system 120. System 200 may include threat detection platform 202, security awareness and training platform 204, user device(s) 206$_{(1-N)}$ (collectively and individually referred to as user device 206), endpoint security system(s) 208$_{(1-M)}$, (collectively referred to as endpoint security system 208), threat reporting platform 210, messaging system 212, and network 260 enabling communication between the system components for information exchange. Network 260 may be an example or instance of network 104, details of which are provided with reference to FIG. 1A and its accompanying description. According to aspects of the present disclosure, system 200 may be owned or managed or otherwise associated with an organization or any entity authorized thereof. In an implementation, system 200 may manage cybersecurity awareness for the organization. In an example, the organization may be an entity that is subscribed to or makes use of services provided by system 200. For ease of description, in the following embodiments, it may be assumed that endpoint security systems 208$_{(1-M)}$ include first endpoint security systems 208$_1$, second endpoint security system 208$_2$, and one or more other endpoint security systems 208$_{(3-M)}$.

According to one or more embodiments, each of threat detection platform 202, security awareness and training platform 204, endpoint security system(s) 208$_{(1-M)}$, threat reporting platform 210, and messaging system 212 may be implemented in a variety of computing systems, such as a mainframe computer, a server, a network server, a laptop computer, a desktop computer, a notebook, a workstation, and any other computing system. In an implementation, each of threat detection platform 202, security awareness and training platform 204, endpoint security system(s) 208$_{(1-M)}$, threat reporting platform 210, and messaging system 212 may be implemented in a server, such as server 106 shown in FIG. 1A. In some implementations, each of threat detection platform 202, security awareness and training platform 204, endpoint security system(s) 208$_{(1-M)}$, threat reporting platform 210, and messaging system 212 may be implemented by a device, such as computing device 100 shown in FIGS. 1C and 1D.

In some embodiments, each of threat detection platform 202, security awareness and training platform 204, endpoint security system(s) 208$_{(1-M)}$, threat reporting platform 210, and messaging system 212 may be implemented as a part of a cluster of servers. In some embodiments, each of threat detection platform 202, security awareness and training platform 204, endpoint security system(s) 208$_{(1-M)}$, threat reporting platform 210, and messaging system 212 may be implemented across a plurality of servers, thereby, tasks performed by each of threat detection platform 202, security awareness and training platform 204, endpoint security system(s) 208$_{(1-M)}$, threat reporting platform 210, and messaging system 212 may be performed by the plurality of servers. These tasks may be allocated among the cluster of servers by an application, a service, a daemon, a routine, or other executable logic for task allocation. The term "application" as used herein may refer to one or more applications, services, routines, or other executable logic or instructions. Each of threat detection platform 202, security awareness and training platform 204, endpoint security system(s) 208$_{(1-M)}$, threat reporting platform 210, and messaging system 212 may comprise a program, service, task, script, library, application or any type and form of executable instructions or code executable on one or more processors. Each of threat detection platform 202, security awareness and training platform 204, endpoint security system(s) 208$_{(1-M)}$, threat reporting platform 210, and messaging system 212 may be combined into one or more modules, applications, programs, services, tasks, scripts, libraries, applications, or executable code.

Referring again to FIG. 2, in some embodiments, threat detection platform 202 may be a platform that monitors, identifies, and manages cybersecurity attacks including phishing attacks faced by the organization or by users within the organization. In some embodiments, a user within the organization may be an individual that is tested and trained by security awareness and training platform 204. In an example, the user may include an individual that can or does receive an electronic message. For example, the user may be an employee of the organization, a member of a group, or an individual who acts in any capacity with security awareness and training platform 204, such as a system administrator, or anyone associated with the organization. The system administrator may be a professional (or a team of professionals) managing organizational cybersecurity aspects. The system administrator may oversee and manage security awareness and training platform 204 on behalf of the organization to ensure cybersecurity goals of the organization are met. For example, the system administrator may oversee Information Technology (IT) systems of the organization for managing simulated phishing campaigns, and any other element within security awareness and training platform 204. A simulated phishing campaign is a technique of testing a user to determine whether the user is likely to recognize a true malicious phishing attack and act appropriately upon receiving the malicious phishing attack.

In some embodiments, threat detection platform 202 may be configured to analyze messages that are reported by users to detect any cybersecurity attacks such as phishing attacks via malicious messages. A malicious message may be a message that is designed to trick a user into causing the download of malicious software (for example, viruses, Trojan horses, spyware, or worms) that is of malicious intent onto a computer. The malicious message may include malicious elements. A malicious element is an aspect of the malicious message that, when interacted with, downloads or installs malware onto a computer. Examples of a malicious element include a URL or link, an attachment, and a macro. The interactions may include clicking on a link, hovering over a link, copying a link and pasting it into a browser, opening an attachment, downloading an attachment, saving an attachment, attaching an attachment to a new message, creating a copy of an attachment, executing an attachment (where the attachment is an executable file), and running a macro. The malware (also known as malicious software) is any software that is used to disrupt computer operations, gather sensitive information, or gain access to private computer systems. Examples of malicious messages include phishing messages, smishing messages, vishing messages, malicious IM, or any other electronic message designed to disrupt computer operations, gather sensitive information, or gain access to private computer systems. Threat detection platform 202 may use information collected from identified cybersecurity attacks and analyze messages to prevent further cybersecurity attacks.

According to some embodiments, threat detection platform 202 may include processor 214 and memory 216. For example, processor 214 and memory 216 of threat detection platform 202 may be CPU 121 and main memory 122, respectively, as shown in FIGS. 1C and 1D. According to an embodiment, threat detection platform 202 may include determination unit 218, dangerousness score calculator 220, and threat database query engine 222. In an implementation, determination unit 218, dangerousness score calculator 220, and threat database query engine 222 may be applications or programs communicatively coupled to processor 214 and memory 216. In some embodiments, determination unit 218, dangerousness score calculator 220, and threat database query engine 222, amongst other units, may include routines, programs, objects, components, data structures, etc., which may perform particular tasks or implement particular abstract data types. Determination unit 218, dangerousness score calculator 220, and threat database query engine 222 may also be implemented as signal processor(s), state machine(s), logic circuitries, and/or any other device or component that manipulates signals based on operational instructions.

In some embodiments, determination unit 218, dangerousness score calculator 220, and threat database query engine 222 may be implemented in hardware, instructions executed by the processing module, or by a combination thereof. The processing module may comprise a computer, a processor, a state machine, a logic array, or any other suitable devices capable of processing instructions. The processing module may be a general-purpose processor which executes instructions to cause the general-purpose processor to perform the required tasks or, the processing module may be dedicated to perform the required functions. In some embodiments, determination unit 218, dangerousness score calculator 220, and threat database query engine 222 may be machine-readable instructions which, when executed by a processor/processing module, perform intended functionalities of determination unit 218, dangerousness score calculator 220, and threat database query engine 222. The machine-readable instructions may be stored on an electronic memory device, hard disk, optical disk, or other machine-readable storage medium or non-transitory medium. In an implementation, the machine-readable instructions may also be downloaded to the storage medium via a network connection. In an example, machine-readable instructions may be stored in memory 216.

Referring again to FIG. 2, in some embodiments, threat detection platform 202 may include threat database 224, circulated threat data storage 226, and endpoint specific threat storage 228. Threat database 224 may include information related to cybersecurity threats and their indicators determined by threat detection platform 202. In an example, threat database 224 may store indicators of malicious elements of malicious messages, information related to endpoint security systems that have failed to detect malicious messages, and dangerousness scores of the malicious messages. An indicator may refer to data included in a message which characterizes or contributes to the characterization that the message is a threat. In an example, an indicator of a message may enable unique identification of the message and its malicious elements. Examples of an indicator include a filename of an attachment to an email, an IP address of a forwarding email server (for example, Mail Transfer Agent, (MTA)), URL of an embedded hyperlink, originator email header fields (for example, "From", and "Sender", "Reply-To"). A dangerousness score is a metric assigned to a message that captures a danger that the message could pose to the organization if the message were interacted with.

In an example implementation, threat database 224 may also store other aspects of the messages and/or indicators, such as the time of reporting of the messages or a summary of contents of the messages. According to an example implementation, the type of indicators stored in threat database 224 may be configured by a platform administrator and may be identified by metadata stored alongside the indicators. The platform administrator may be a professional (or a team of professionals) that administers one or more of threat detection platform 202, security awareness and training platform 204, and threat reporting platform 210, as well as services running on one or more of threat detection platform 202, security awareness and training platform 204, and threat reporting platform 210 for a service provider to the organization. In an example, threat database 224 may store the information in an organized manner. For example, information stored in threat database 224 may be formatted in a standardized Structured Threat Information Expression (STIX) language, a known standard expression language, or any proprietary format. According to an implementation, threat database 224 may be implemented as a single unified database. In some implementations, threat database 224 may be implemented as multiple databases. Also, threat database 224 may be aggregated by the field of operation of the organization, by organization size, or by organization location.

In an implementation, circulated threat data storage 226 may store one or more circulated threat data sets. A circulated threat data set is a set of data that has been generated by running one or more queries on threat database 224. Also, endpoint-specific threat storage 228 may store one or more endpoint-specific threat data sets. In an example, an endpoint-specific threat data set may be a version of a circulated threat data set that has been processed to allow it to be processed by a specific endpoint security system. Information related to cybersecurity threats stored in threat database 224, information related to the one or more circulated threat data sets stored in circulated threat data storage 226, and information related to the one or more endpoint-specific threat data sets stored in endpoint-specific threat storage 228 may be periodically or dynamically updated as required. In an implementation, threat database 224, circulated threat data storage 226, and endpoint specific threat storage 228 may include any type or form of storage, such as a database or a file system coupled to memory 216. Although it has been shown in FIG. 2 that threat database 224, circulated threat data storage 226, and endpoint-specific threat storage 228 are implemented within threat detection platform 202, in some embodiments, threat database 224, circulated threat data storage 226, and endpoint-specific threat storage 228 may be implemented external to threat detection platform 202.

In one or more embodiments, security awareness and training platform 204 may facilitate cybersecurity awareness training, for example, via simulated phishing campaigns, computer-based trainings, remedial trainings, and risk score generation and tracking. In an implementation, security awareness and training platform 204 may execute the simulated phishing campaign by sending out one or more simulated phishing messages periodically or occasionally to the users and observing responses of the users to simulated phishing messages. A simulated phishing message may mimic a real phishing message and appear genuine to entice a user to respond/interact with the simulated phishing message. The simulated phishing message may include links, attachments, macros, or any other simulated phishing threat that resembles a real phishing threat. In an example, the simulated phishing message may be any message that is sent to a user with an intent of training him or her to recognize phishing attacks that would cause the user to reveal confidential information or otherwise compromise the security of the organization. In an example, a simulated phishing message may be an email, a Short Message Service (SMS) message, an Instant Messaging (IM) message, a voice message, or any other electronic method of communication or messaging. In some example implementations, security awareness and training platform 204 may be a Computer Based Security Awareness Training (CBSAT) system that performs security services such as performing simulated phishing campaigns on a user or a set of users within an organization as a part of security awareness training.

According to some embodiments, security awareness and training platform 204 may include processor 230 and memory 232. For example, processor 230 and memory 232 of security awareness and training platform 204 may be CPU 121 and main memory 122, respectively, as shown in FIGS. 1C and 1D. According to an embodiment, security awareness and training platform 204 may include message generator 234. Message generator 234 may include various functionalities that may be associated with cybersecurity awareness training. In an implementation, message generator 234 may be an application or a program that manages various aspects of a simulated phishing attack, for example, tailoring and/or executing a simulated phishing attack. A simulated phishing attack may test the readiness of a user to handle phishing attacks such that malicious actions are prevented. For example, message generator 234 may monitor and control the timing of various aspects of a simulated phishing attack, including processing requests for access to attack results and performing other tasks related to the management of a simulated phishing attack.

In some embodiments, message generator 234 may generate simulated phishing messages. A simulated phishing message may be a defanged message. The simulated phishing messages generated by message generator 234 may be of any appropriate format. For example, the simulated phishing messages may be email messages, text messages, short message service (SMS) messages, instant messaging (IM) messages used by messaging applications such as, e.g., WhatsApp™, or any other type of message. Message type to be used in a particular simulated phishing communication may be determined by, for example, message generator 234. The simulated phishing messages may be generated in any appropriate manner, e.g., by running an instance of an application that generates the desired message type, such as a Gmail® application, a Microsoft Outlook™ application, a WhatsApp™ application, a text messaging application, or any other appropriate application. In an example, message generator 234 may generate simulated phishing communications in a format consistent with specific messaging platforms, for example, Outlook 365™, Outlook® Web Access (OWA), Webmail™, iOS®, Gmail®, and any other messaging platforms. The simulated phishing communications may be used in simulated phishing attacks or in simulated phishing campaigns.

Referring again to FIG. 2, in some embodiments, user device 206 may be any device used by a user. The user may be an employee of an organization, a client, a vendor, a customer, a contractor, or any person associated with the organization. User device 206 may be any computing device, such as a desktop computer, a laptop, a tablet computer, a mobile device, a Personal Digital Assistant (PDA), or any other computing device. In an implementation, user device 206 may be a device, such as client device 102 shown in FIG. 1A and FIG. 1B. User device 206 may be implemented by a device, such as computing device 100 shown in FIG. 1C and FIG. 1D. According to some embodiments, user device 206 may include processor 236 and memory 238. In an example, processor 236 and memory 238 of user device 206 may be CPU 121 and main memory 122, respectively, as shown in FIGS. 1C and 1D. User device 206 may also include user interface 240, such as a keyboard, a mouse, a touch screen, a haptic sensor, a voice-based input unit, or any other appropriate user interface. It shall be appreciated that such components of user device 206 may correspond to similar components of computing device 100 in FIGS. 1C and 1D, such as keyboard 126, pointing device 127, I/O devices 130*a-n* and display devices 124*a-n*. User device 206 may also include display 242, such as a screen, a monitor connected to the device in any manner, or any other appropriate display. In an implementation, user device 206 may display received content (for example, messages) for the user using display 242 and is able to accept user interaction via user interface 240 responsive to the displayed content.

In some implementations, user device 206 may include a communications module (not shown). This may be a library, Application Programming Interface (API), a set of scripts, or any other code that may facilitate communications between user device 206 and any of threat detection platform 202, security awareness and training platform 204, endpoint security system 208, threat reporting platform 210, messaging system 212, a third-party server, or any other server. In some embodiments, the communications module determines when to transmit information from user device 206 to external servers via network 260. In some embodiments, the communications module receives information from threat detection platform 202, security awareness and training platform 204, endpoint security system 208, threat reporting platform 210, and/or messaging system 212, via network 104. In some embodiments, the information transmitted or received by the communications module may correspond to a message, such as an email, generated or received by a messaging application.

Referring again to FIG. 2, in some embodiments, user device 206 may include email client 244. In one example implementation, email client 244 may be an application installed on user device 206. In another example implementation, email client 244 may be an application that can be accessed over network 260 without being installed on user device 206. In an implementation, email client 244 may be any application capable of composing, sending, receiving, and reading email messages. In an example, email client 244 may facilitate a user to create, receive, organize, and otherwise manage email messages. In an implementation, email client 244 may be an application that runs on user device 206. In some implementations, email client 244 may be an application that runs on a remote server or on a cloud implementation and is accessed by a web browser. For example, email client 244 may be an instance of an application that allows viewing of a desired message type, such as any web browser, Microsoft Outlook™ application (Microsoft, Mountain View, California), IBM® Lotus Notes® application, Apple® Mail application, Gmail® application (Google, Mountain View, California), WhatsApp™ (Facebook, Menlo Park, California), a text messaging application, or any other known or custom email application. In some embodiments, email client 244 can be configured to display electronic training. In an example, a user of user device 206 may be mandated to download and install email client 244 by the organization. In another example, email client 244 may be provided by the organization as default. In some examples, a user of user device 206 may select, purchase and/or download email client 244 through an application distribution platform. In some examples, user device 206 may receive simulated phishing messages via email client 244.

In one or more embodiments, email client 244 may include email client plug-in 246. An email client plug-in may be an application or program that may be added to an email client for providing one or more additional features or for enabling customization to existing features. For example, email client plug-in 246 may be used by the user to report suspicious emails. In an example, email client plug-in 246 may include a User Interface (UI) element such as a button to trigger an underlying function. The underlying function of client-side plug-ins that use a UI button may be triggered when a user clicks the button. Some examples of client-side plug-ins that use a UI button include, but are not limited to, a Phish Alert Button (PAB) plug-in, a Report Message add-in, a task create plug-in, a spam marking plug-in, an instant message plug-in, a social media reporting plug-in and a search and highlight plug-in. In an embodiment, email client plug-in 246 may be a PAB plug-in. In some embodiments, email client plug-in 246 may be a Report Message add-in. In an example, email client plug-in 246 may be implemented in an email menu bar of email client 244. In another example, email client plug-in 246 may be implemented in a ribbon area of email client 244. In another example, email client plug-in 246 may be implemented in any area of email client 244.

In some implementations, email client plug-in 246 may not be implemented in email client 244 but may coordinate and communicate with email client 244. In some implementations, email client plug-in 246 is an interface local to email client 244 that supports email client users. In one or more embodiments, email client plug-in 246 may be an application that supports the user, i.e., recipients of communications, to report suspicious phishing communications that they believe may be a threat to them or their organization. Other implementations of email client plug-in 246 not discussed here are contemplated herein. In one example, email client plug-in 246 may enable the user to report any message (for example, the message that the user finds to be suspicious or believe to be malicious) through user action (for example, by clicking on the button).

According to an implementation, endpoint security system 208 may be a secure email gateway or other system deployed by the organization. In an example, endpoint security system 208 may be a third-party system. Endpoint security system 208 may be configured to analyze incoming emails to messaging system 212 to the organization for cybersecurity threats. In an example, endpoint security system 208 may analyze an incoming email to determine whether the incoming email is a malicious message, and based on the determination, endpoint security system 208 may determine how the incoming email should be processed. For example, endpoint security system 208 may process the incoming email to deliver the incoming email, quarantine the incoming email, and/or delete the incoming email. In an implementation, endpoint security system 208 may be supported by an endpoint security system-specific API or endpoint security system-specific deployment function.

In an implementation, endpoint security system 208 may be configured to filter and block malicious messages addressed to users within the organization according to rules within the endpoint security system 208. In one or more embodiments, endpoint security system 208 may be configured to add one or more extended headers or X-headers in all emails as they are processed. An X-header may be understood as a custom proprietary email header that allows capabilities that are not offered with standard email headers. X-headers are called such because their name must begin with "X-" (for example, to delineate the X-header from standardized header fields). In an example implementation, the one or more X-headers may be added for identification of endpoint security system 208 by other systems including threat detection platform 202. According to one implementation, the email processed by endpoint security system 208 may be subsequently processed by threat detection platform 202. In an example, the email may have traversed endpoint security system 208 before it reaches its intended users.

In some embodiments, threat reporting platform 210 may be a platform that enables the user to report message(s) that the user finds to be suspicious or believes to be malicious, through email client plug-in 246 or any other suitable means. In some examples, threat reporting platform 210 may be configured to manage a deployment of and interactions with email client plug-in 246, allowing the user to report the suspicious messages directly from email client 244. In some example implementations, threat reporting platform 210 may be configured to analyze a reported message to determine whether the reported message is a simulated phishing message. In some examples, threat reporting platform 210 may analyze the reported message to determine a presence of a simulated phishing identifier, such as a simulated phishing message X-header or such other identifiers. Threat reporting platform 210 may determine that the reported message is a simulated phishing message on identifying the simulated phishing message X-header or such other identifiers.

Referring again to FIG. 2, messaging system 212 may be an email handling system owned or managed or otherwise associated with the organization or any entity authorized thereof. In an implementation, messaging system 212 may be configured to receive, send, and/or relay outgoing emails (for example, simulated phishing communications) between message senders (for example, security awareness and training platform 204) and recipients (for example, user device 206). Messaging system 212 may include processor 250, memory 252, and email server 254. For example, processor 250 and memory 252 of messaging system 212 may be CPU 121 and main memory 122, respectively, as shown in FIG. 1C and FIG. 1D.

In an implementation, email server 254 may be any server capable of handling, receiving, and delivering emails over network 260 using one or more standard email protocols and standards, such as Post Office Protocol 3 (POP3), Internet Message Access Protocol (IMAP), Simple Mail Transfer Protocol (SMTP), and Multipurpose Internet Mail Extension (MIME). Email server 254 may be a standalone server or a part of an organization's server. Email server 254 may be implemented using, for example, Microsoft® Exchange Server, and HCL Domino®. In an implementation, email server 254 may be a server 106 shown in FIG. 1A. Email server 254 may be implemented by a device, such as computing device 100 shown in FIG. 1C and FIG. 1D. Alternatively, email server 254 may be implemented as a part of a cluster of servers. In some embodiments, email server 254 may be implemented across a plurality of servers, thereby, tasks performed by email server 254 may be performed by the plurality of servers. These tasks may be allocated among the cluster of servers by an application, a service, a daemon, a routine, or other executable logic for task allocation. In an implementation, user device 206 may receive simulated phishing communications through email server 254 of messaging system 212.

In an example implementation, on receiving a message (for example, an email) in his or her mailbox, if a user of user device 206 suspects that the message is malicious, the user may report the message using email client plug-in 246. In an implementation where email client plug-in 246 provides a UI element such as a button in email client 244 of user device 206 then when the user suspects that the message is malicious, the user may click on the UI element to report the message. The user may click on the UI element using, for example, a mouse pointer and the user may click on the UI element when the message is open or when the message is highlighted in a list of inbox messages.

In some implementations, when the user selects to report the message via email client plug-in 246, email client plug-in 246 may receive an indication that the message was reported by the user of user device 206 as a suspected malicious message. In response, email client plug-in 246 may cause email client 244 to forward the reported message or a copy of the reported message to threat reporting platform 210. Threat reporting platform 210 may analyze the reported message to identify a simulated phishing identifier in the message. The simulated phishing identifier may be found in a message header, message body, or other parts of the message. In some examples, the simulated phishing identifier is added by security awareness and training platform 204 to indicate that that the message is a simulated phishing message. For example, security awareness and training platform 204 may add a simulated phishing message X-header as the simulated phishing identifier for the simulated phishing messages.

On identifying the simulated phishing identifier, threat reporting platform 210 may determine that the reported message is a simulated phishing message and communicate to security awareness and training platform 204 that the user has correctly reported a simulated phishing message. With the reported message determined as the simulated phishing message, threat reporting platform 210 does not forward the reported message to threat detection platform 202. If analysis of the reported message by threat reporting platform 210 indicate an absence of a simulated phishing identifier, threat reporting platform 210 may notify security awareness and training platform 204 that the reported message is not a simulated phishing message and the reported message will be sent for threat detection analysis by threat detection platform 202. In some embodiments, on notification from the threat reporting platform 210, security awareness and training platform 204 may forward the reported message or a copy of the reported message to threat detection platform 202 for threat analysis.

In some embodiments, in response to receiving the indication that the user has reported the message, email client plug-in 246 causes email client 244 to forward the reported message or a copy of the reported message to threat detection platform 202 for threat analysis. In some examples, email client plug-in 246 may send a notification to security awareness and training platform 204 that the user has reported a message received at his or her mailbox as suspicious or potentially malicious and upon determining that the message is not a simulated phishing message, security awareness and training platform 204 may retrieve the message reported by the user from the user's mailbox and forward the message to threat detection platform 202. In some examples, the user may proactively forward the message to a security authority who, in turn, may send the message to threat detection platform 202. The security authority may be a security officer or a cybersecurity team having authority over security aspects within a deployment of security awareness and training platform 204. The security authority's responsibilities include defining simulated phishing messages (for example, determining the types of simulated malicious elements used for simulated phishing messages), and identification and classification of threats within reported emails. Examples of the security authority include but are not limited to, an IT department, a security team, a security manager, an Incident Response (IR) team, and an Artificial Intelligence (AI) or Machine Language (ML) incident handler. Various combinations of reporting, retrieving, and forwarding the message to threat detection platform 202 not described are contemplated herein.

According to an implementation, determination unit 218 may receive from a user within the organization (for example, the user of user device 206) a report of a malicious message. Determination unit 218 on receipt of the reported malicious message, may analyze the reported malicious message to identify the presence of one or more malicious elements in various portions of the reported malicious message. The one or more malicious elements may be present in links, attachments, macros, and other such elements.

In one or more embodiments, determination unit 218 may perform threat analysis on the reported malicious message or identified portions of the reported malicious message such as links, attachments, and the like, using a rule set. In one or more embodiments, determination unit 218 may be assisted in the threat analysis by the security authority. The rule set includes one or more characteristic detection rules. Determination unit 218 may compile the rule set and executes the compiled rule set on the reported malicious message or the identified portions of the message. In some examples, determination unit 218 may identify a combination rule comprising a plurality of characteristic detection rules to be applied against the reported malicious message to detect characteristics of the reported malicious message. The combination rule includes multiple characteristic detection rules combined via one or more logical operators forming an expression with a binary or "yes/no" result. An example of a characteristic detection rule is a Yet Another Recursive Algorithm (YARA) rule. Each of the characteristic detection rules include a description of a characteristic based on either a textual or a binary pattern. In some examples, for each characteristic detection rule, determination unit 218 generates a tag which has a predetermined tag identifier, a combination rule identifier, and an index. Determination unit 218 may attach the tags to the characteristic detection rules of the rule set before the rule set is compiled. In some examples, determination unit 218 may execute the compiled rule set against the reported malicious message to detect whether the reported malicious message has any of the characteristics that the characteristic detection rules in the rule set test for. The execution of the compiled rule set returns the tags, the name, and the metadata for each of the characteristic detection rules in the rule set that matched against the reported malicious message such as for which the binary or textual pattern specified by the characteristic detection rule was found in the message. Based on the identification (for example, using the tags, the name or the metadata for the characteristic detection rule, or any combination of tags, name, and metadata for the characteristic detection rule) of the returned characteristic detection rules, determination unit 218 may construct and evaluate a logical expression of each combination rule.

Using a result of each of the evaluated combination rule against the reported malicious message or portions of the reported malicious message, determination unit 218 may classify the reported malicious message based on detected characteristics. For example, the result may indicate that the reported malicious message is a threat, or the result may indicate that the reported malicious message is safe and genuine (such as, a simulated phishing email). In some embodiments, the result of the executed rule set may not allow a conclusive classification of whether the reported malicious message is a threat or is safe. In an example implementation, determination unit 218 may record the tags and flag the reported malicious message for analysis by the security authority. In an implementation, determination unit 218 may attach a level of confidence to the classification of the reported malicious message. In an example implementation, determination unit 218 may define a threshold of confidence below which the security authority may verify the classification performed by threat detection platform 202. In an example, where the reported malicious message is classified to be of the type "threat" by determination unit 218, determination unit 218 may determine indicators within the reported malicious message which characterizes the reported malicious message.

In an example, where determination unit 218 is not able to classify the reported malicious message with sufficient confidence, determination unit 218 provides the reported malicious message to the security authority to make the classification. The value of the sufficient confidence may be a configurable value. For example, the value of the sufficient confidence may be set to 90%. In another example, all reported malicious messages may be provided to the security authority to make the classification of threat or safe. In scenarios where the reported malicious message is classified to be of the type "threat" by the security authority, the security authority may determine the indicators.

According to an implementation, the security authority may query threat database 224 to assist in his or her classification of the reported malicious message. As a result of the query, the security authority may be provided with information about the reported malicious message including, but not limited to indicators within the malicious message and the dangerousness score of the malicious message. In response to receiving the information based on the query and/or in response to the data provided by threat detection platform 202 (or a component therein, such as determination unit 218), the security authority may make a classification of the reported malicious message into a predetermined category. Examples of the predetermined category include "clean", "threat", and "spam". The security authority may provide the classification of the reported malicious message to threat detection platform 202.

According to some embodiments, determination unit 218 may identify one or more indicators of the one or more malicious elements of the malicious message. In an implementation, determination unit 218 may identify the one or more indicators of the one or more malicious elements of the malicious message based the characteristic detection rules, the result of the execution of the rule set on the malicious message, and the input and decision of the security authority. In an example implementation, determination unit 218 may map a rule and a result may directly to an indicator or a specific indicator may be derived from the rule and the result. For example, when the rule is a fuzzy rule which allows a range of results to be returned, an indicator may be defined to be one or more specific examples of the result rather than the fuzzy rule. In an implementation, determination unit 218 may store the one or more indicators of the one or more malicious elements of the malicious message and determining agent (e.g., threat detection platform 202 or the security authority) in threat database 224. In some implementations, determination unit 218 may also store the level of confidence of the classification of the malicious message as metadata associated with the reported malicious message in threat database 224.

According to one or more embodiments, determination unit 218 may further determine whether the malicious message has been previously processed (for example, scanned, analyzed, or any other form of processing) by first endpoint security system $208_1$. In an implementation, determination unit 218 may determine an identification of first endpoint security system $208_1$ through which the malicious message has traversed. According to an implementation, determination unit 218 may determine the identification of first endpoint security system $208_1$ based on the presence of one or more identifiable X-headers in a header of the malicious message. In some implementations, determination unit 218 may determine the identification of first endpoint security system $208_1$ based on an input received from the system administrator. In an example, if the reported malicious message is determined to be a threat, then identified first endpoint security system $208_1$ may reflect the endpoint security system that failed to detect the malicious message.

In an implementation, first endpoint security system $208_1$ may have added one or more X-headers in a header of the malicious message as it is processed. In an example, an X-header is added in such a way that its addition can be clearly and unambiguously determined. An example of such an addition may be "X-<vendor>-<other info>", where <vendor> may be a known vendor of first endpoint security system $208_1$ and <other info> may indicate that it relates to first endpoint security system $208_1$ such as "virus-definition". According to an example implementation, mere presence of one or more X-headers may be considered sufficient to determine that the malicious message has been processed by first endpoint security system $208_1$ on its way into the organization.

In some implementations, first endpoint security system $208_1$ may be configured by the system administrator. In an example, the system administrator may provide information of first endpoint security system $208_1$ deployed by the organization to threat detection platform 202 in a defined manner such as using a web page or configuration utility within security awareness and training platform 204. An example of the information of first endpoint security system $208_1$ may be a vendor name, a marketing name, a part number, a revision, a definitions file revision, a date of supply, a date of compilation, or a version number. Also, the presence of the one or more X-headers in the malicious message and/or input received from the system administrator regarding first endpoint security system $208_1$ deployed by the organization may be used to infer that that the malicious message which has been reported by the user and has been determined to be a threat was not blocked by first endpoint security system $208_1$. In an implementation, determination unit 218 may store information related to the first endpoint security system $208_1$ in threat database 224.

In one or more embodiments, dangerousness score calculator 220 may calculate a dangerousness score for the malicious message as described below to determine a level of danger that the malicious message may present to the user or the organization. In an example, the dangerousness score may be a function of the number of malicious elements and the severity of the malicious elements in the malicious message.

Inputs: Number of malicious elements in a malicious message (MM)=r;

$$\text{Severity} = \Sigma_{a=1}^{r}(\text{malicious element } a \text{ severity}); \quad (1)$$

$$\text{DangS} = r*\text{Severity}; \quad (2)$$

The dangerousness score may denote how much damage a malicious message has the potential to cause an organization. The dangerousness score may be directly proportionate to the number of malicious elements in a malicious message. Let the number of malicious elements in the malicious message be r.

$$\text{DangS} \propto r; \quad (3)$$

The dangerousness score may be directly proportionate to the severity of malicious elements that are in the malicious message. The severity of a malicious element is a measure of effect that interacting with the malicious element can have on the security of an organization. In examples, the dangerousness score is high for a malicious message that has a certain number of malicious elements with high severity. In examples, the dangerousness score is low for a message with a single malicious element and severity within a certain threshold.

$$\text{Severity} \propto \Sigma_{a=1}^{r} \text{ malicious element } a \text{ severity}; \quad (4)$$

The dangerousness score of a malicious message may be a function of any of the above elements alone or in combination, linearly or scaled, or using any other data regarding the malicious elements in the malicious message. Let A represent scaling factors. As an example:

$$\text{DangS} \propto A_{severity} \cdot \text{Severity} \cdot A \cdot r; \quad (5)$$

In an example, the severity may be assigned to the malicious elements by the security authority or by threat detection platform 202. For example, a malicious element that can inject a virus and render a computer unusable may have a higher severity than a malicious element that attempts to steal user credentials. The dangerousness score of a malicious message may be a function of any of the above elements alone or in combination, using any data regarding user interactions. In an implementation, dangerousness score calculator 220 may store the dangerousness score for the malicious message as metadata associated with the one or more indicators of the one or more malicious elements of the malicious message in threat database 224.

According to one or more embodiments, threat database 224 may be configured to receive one or more queries related to indicators. In an example, threat database 224 may be configured to receive a query for indicators that evaded first endpoint security system $208_1$. As described before, threat database 224 may include indicators that identify malicious elements within emails that indicate that the emails are malicious messages. Threat database 224 may also include other items of data and metadata associated with the malicious elements and the malicious messages. In examples, an item of associated data may be a dangerousness score of a malicious message that included the indicator.

In an implementation, threat database 224 may be queried by threat database query engine 222 according to a query. As may be understood, threat database 224 may be queried multiple times depending on a frequency of queries received by threat database 224. In an example implementation, threat database query engine 222 may execute the query on threat database 224 to generate a sub-set of data. In an implementation, responsive to the query, a circulated threat data set comprising a sub-set of threat database 224 may be generated in the same format as threat database 224. In an example, the circulated threat data set may include metadata or indicators associated with first endpoint security system $208_1$. In some examples, the circulated threat data set may be formatted in a standardized STIX language or any proprietary format.

In an example implementation, threat database 224 may be configured to receive the query for indicators with a minimum level of the dangerousness score. In response, threat database 224 may provide the indicators meeting the minimum level of the dangerousness score. According to an implementation, threat database query engine 222 may process the circulated threat data set to generate an endpoint-specific threat data set. The endpoint-specific threat data set may be generated in a format compatible with or used by first endpoint security system $208_1$. In an example, the endpoint-specific threat data set may be generated in a common, standardized format (that may be processed by many specific endpoint security systems). In an example, the common, standardized format is the STIX language. In some examples, the endpoint-specific threat data set may be generated in a vendor-specific format. In an implementation, threat database query engine 222 may process the circulated threat data set multiple times to generate multiple endpoint-specific threat data sets. In an example, the endpoint-specific threat data set may include all indicators known to have evaded first endpoint security system $208_1$ Although it has been described that a single query is received by threat database 224 and a single circulated threat data set is generated based on the query, in some embodiments, more than one query may be received by threat database 224 and accordingly, more than one circulated threat data set and endpoint-specific threat data set may be generated. In an implementation, threat database query engine 222 may store the circulated threat data sets in circulated threat data storage 226 and endpoint-specific threat data sets in endpoint-specific threat storage 228.

In one or more embodiments, threat database query engine 222 may provide access to threat database 224 to the organization for protection against malicious messages having the one or more indicators. In an example implementation, the access of threat database 224 may be provided to the organization based on specific terms and conditions. In an implementation, threat database query engine 222 may provide the circulated threat data set and/or the endpoint-specific threat data set to the system administrator of the organization. In an example, the system administrator may control how the circulated threat data set and/or the endpoint-specific threat data set is applied and used by first endpoint security system $208_1$. For example, the system administrator may determine the action of first endpoint security system $208_1$ in response to the content of the circulated threat data set and/or the endpoint-specific threat data set. In an example, all incoming messages which satisfy a rule within the circulated threat data set and/or the endpoint-specific threat data set may be blocked from delivery. In some examples, incoming messages that satisfy a rule generated by the security authority or a local rule(s) (i.e., a rule determined by the organization) are blocked from delivery and all other messages are delivered to an alternative inbox such as a junk folder or a spam folder of a mailbox.

According to an implementation, threat database query engine 222 may provide the circulated threat data set and/or the endpoint-specific threat data set to second endpoint security system 208₂. In the implementation, second endpoint security system 208₂ may be configured with the circulated threat data set and/or the endpoint-specific threat data set to protect the organization from malicious messages which evade first endpoint security system $208_1$. In scenarios where second endpoint security system 208₂ is used to protect the organization from malicious messages which have evaded first endpoint security system $208_1$, threat database 224 or the circulated threat data set and/or the endpoint-specific threat data set may be provided to the organization in a format that can be processed by or is compatible with second endpoint security system 208₂, for example, based on a standardized language, an API, or deployment function compatible with second endpoint security system 208₂.

Although it has been described that threat database query engine 222 may be configured to provide access to threat database 224 to the organization, in some embodiments, a third-party entity may provide access to threat database 224 to the organization.

In an implementation, the platform administrator may also provide the circulated threat data set and/or the endpoint-specific threat data set to one or more providers or vendors of one or more other endpoint security systems $208_{(3-M)}$ to enable them to improve their products. For example, the platform administrator may provide an example circulated threat data set and/or endpoint-specific threat data set to a provider or vendors of an endpoint security systems 208₃ where the example circulated threat data set and/or endpoint-specific threat data set may include indicators known to have evaded the endpoint security system 208₃. In another example, the platform administrator may provide a circulated threat data set and/or an endpoint-specific threat data set comprising indicators which have traversed endpoint security system 208₄ to a provider of endpoint security system 208₄. In an example, in response to receiving the circulated threat data set and/or the endpoint-specific threat data set, the one or more providers or the vendors are enabled to identify indicators that are known to evade their products, and to protect against malicious messages having the one or more indicators.

According to an example implementation, access to the circulated threat data set and/or the endpoint-specific threat data set may require a subscription and/or the payment of an appropriate fee. Depending on the level of subscription and/or or the payment of the appropriate fee, different queries may be used to generate the circulated threat data set that produces the endpoint-specific threat data set. In an example, a level of dangerousness score of indicators included in the circulated threat data set may be varied according to the subscription. In some examples, a premium subscription or fee may be charged for the circulated threat data set and/or the endpoint-specific threat data set, which include indicators known to evade first endpoint security system $208_1$ used by the organization.

In an example implementation, the organization may access information included within threat database 224 without receiving a local copy in the form of the circulated threat data set and/or the endpoint-specific threat data set. In an example, access to threat database 224 may be provided in response to a remote query to assist the organization in determining whether a specific message is a malicious message. According to an example, the system administrator may request data on a message from a centralized system, for example, via an administration console, an application, or a nominated email address, and the data may be returned from the centralized system to the organization. In an example, the data may include indicators within the message or the dangerousness score of the message.

According to one or more embodiments, one or more endpoint security systems $208_{(3-M)}$ may be associated with test email accounts. In an implementation, identified malicious messages may be sent to the test email accounts to determine which endpoint security systems they may evade and to provide further metadata for threat database 224. In an example implementation, threat detection platform 202 may be provided with a message which has been identified as a malicious message by either threat reporting platform 210 or by the security authority. Threat detection platform 202 may also have access to data that identifies first endpoint security system $208_1$ that is deployed by the organization that reported the malicious message. In an implementation, threat detection platform 202 may have inferred that the malicious message has passed through the deployed endpoint security system $208_1$ without detection. Threat detection platform 202 may send the malicious message to the one or more test email accounts associated with one or more endpoint security systems $208_{(3-M)}$ held in a safe environment, for example, installed in a sandbox. In an implementation, threat detection platform 202 may determine whether the malicious message is delivered successfully to the one or more test email accounts. Depending on whether the malicious message is delivered successfully, threat detection platform 202 may add metadata to the indicators which have been derived from the malicious message and which are stored in threat database 224. The metadata may identify the one or more endpoint security systems $208_{(3-M)}$ that the message and therefore the indicators may have evaded.

Figure 3:
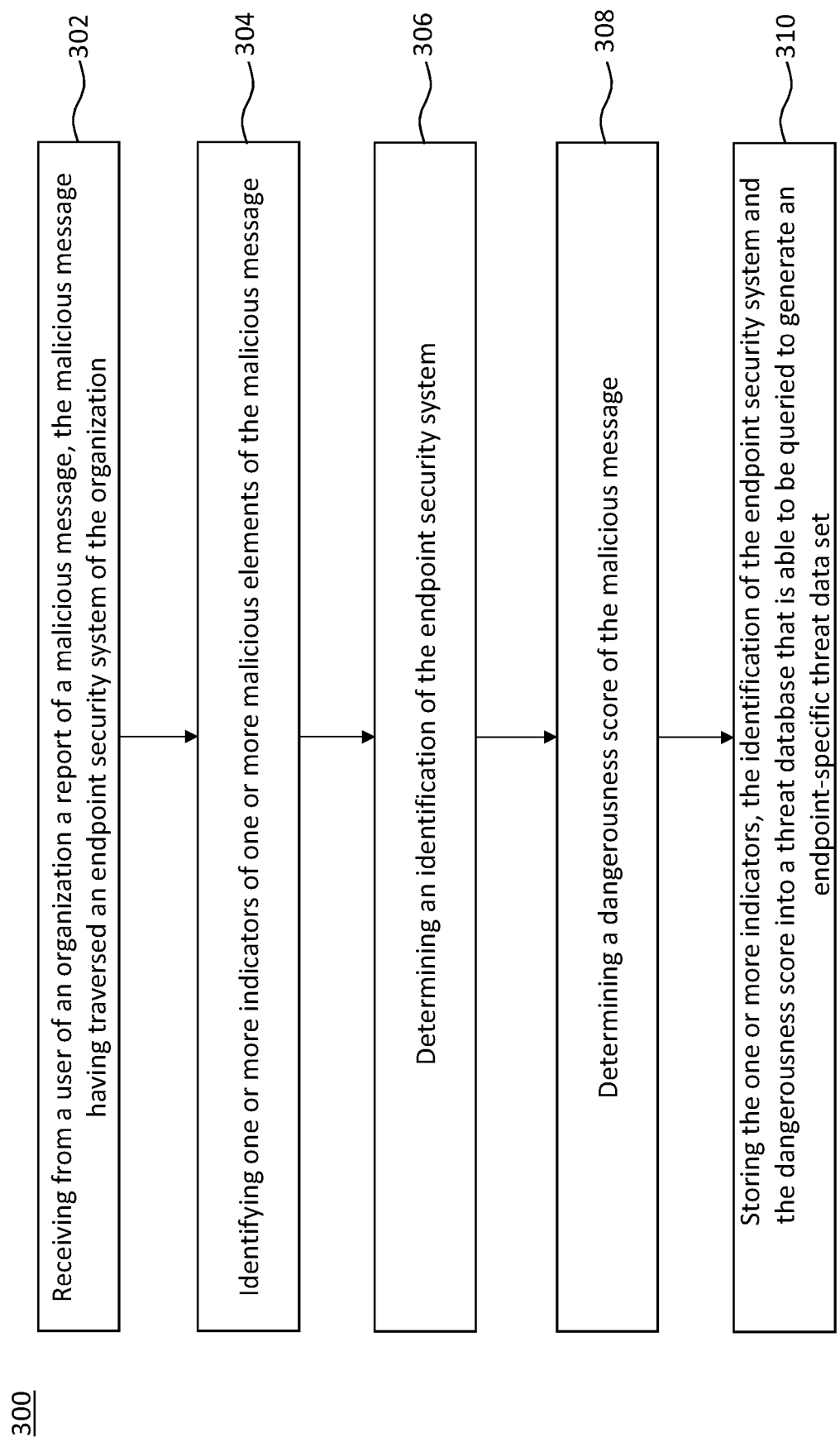
FIG. 3 depicts a flowchart for determination of indicators of malicious elements within email messages, according to some embodiments.

FIG. 3 depicts flowchart 300 for determination of indicators of malicious elements within email messages, according to some embodiments. In a brief overview of an implementation of flowchart 300, at step 302, a report of a malicious message having traversed an endpoint security system of an organization is received from a user of the organization. At step 304, one or more indicators of one or more malicious elements of the malicious message are identified. At step 306, an identification of the endpoint security system is determined. At step 308, a dangerousness score of the malicious message is determined. At step 310, the one or more indicators, the identification of the endpoint security system, and the dangerousness score are stored into threat database 224 that is able to be queried to generate an endpoint-specific threat data set.

Step 302 includes receiving from a user of an organization a report of a malicious message, the malicious message having traversed an endpoint security system of the organization. In an example, the endpoint security system may be first endpoint security system $208_1$. According to an implementation, determination unit 218 may receive from the user of the organization the report of the malicious message. In response to receiving the report of the malicious message, determination unit 218 may classify the malicious message as a threat, where the classification has a level of confidence. Determination unit 218 may use any of the systems and methods described herein to classify the malicious message as a threat.

Step 304 includes identifying one or more indicators of one or more malicious elements of the malicious message. In an implementation, determination unit 218 may identify one or more indicators of one or more malicious elements of the malicious message. Determination unit 218 may use any of the systems and methods described herein to identify one or more indicators of one or more malicious elements of the malicious message.

Step 306 includes determining an identification of the endpoint security system. According to an implementation, determination unit 218 may determine the identification of the endpoint security system. According to an implementation, determination unit 218 may determine the identification of the endpoint security system from one or more headers of the malicious message. In some implementations, determination unit 218 may determine the identification of the endpoint security system from input received from the system administrator. Determination unit 218 may use any of the systems and methods described herein to determine the identification of the endpoint security system.

Step 308 includes determining a dangerousness score of the malicious message. In an implementation, dangerousness score calculator 220 may be configured to determine the dangerousness score of the malicious message. In an example, the dangerousness score may be a function of the number of malicious elements and the severity of the malicious elements in the malicious message. Dangerousness score calculator 220 may use any of the systems and methods described herein to determine the dangerousness score of the malicious message.

Step 310 includes storing the one or more indicators, the identification of the endpoint security system, and the dangerousness score into threat database 224 that is able to be queried to generate an endpoint-specific threat data set. In an implementation, the level of confidence may also be stored into threat database 224 along with the one or more indicators, the identification of the endpoint security system, and the dangerousness score.

Figure 4:
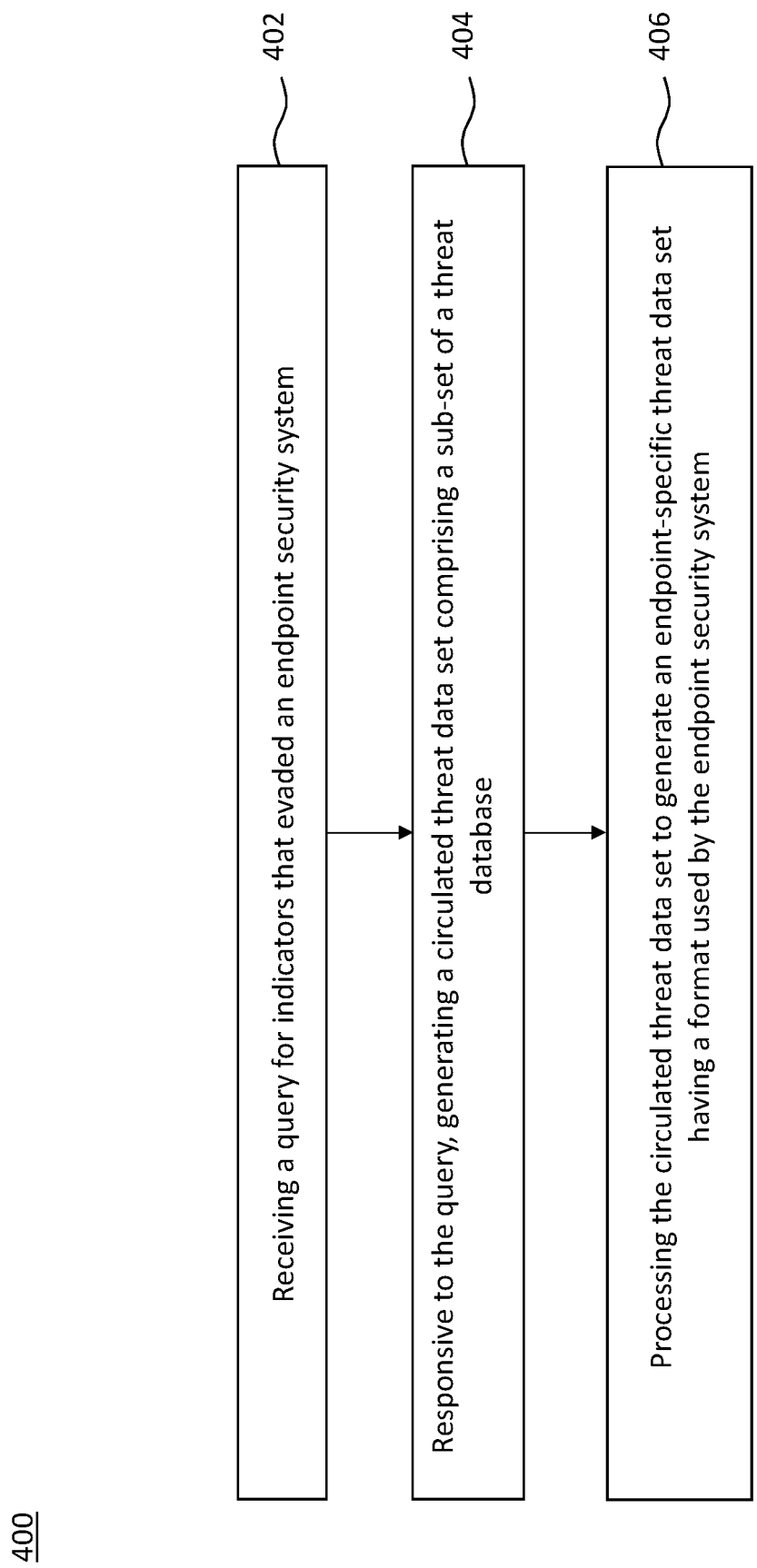
FIG. 4 depicts a flowchart for generation of an endpoint-specific threat data set based on a threat database, according to some embodiments.

FIG. 4 depicts flowchart 400 for generation of an endpoint-specific threat data set based on a threat database, according to some embodiments. In a brief overview of an implementation of flowchart 400, at step 402, a query for indicators that evaded an endpoint security system is received. At step 404, a circulated threat data set comprising a sub-set of threat database 224 is generated in response to the query. At step 406, the circulated threat data set is processed to generate an endpoint-specific threat data set having a format used by the endpoint security system.

Step 402 includes receiving a query for indicators that evaded an endpoint security system. In an example, the endpoint security system may be first endpoint security system $208_1$. According to an implementation, threat database 224 may be queried by threat database query engine 222 for indicators that evaded the endpoint security system. In an example implementation, threat database 224 may receive the query for indicators with a minimum level of the dangerousness score for the endpoint security system.

Step 404 includes, generating a circulated threat data set comprising a sub-set of threat database 224, responsive to the query. In an implementation, threat database query engine 222 may execute the query on threat database 224 based on business rules or any other set of rules to generate the circulated threat data set. Threat database query engine 222 may use any of the systems and methods described herein to generate the circulated threat data set comprising the sub-set of threat database 224 in response to the query.

Step 406 includes processing the circulated threat data set to generate an endpoint-specific threat data set having a format used by the endpoint security system. According to an implementation, threat database query engine 222 may process the circulated threat data set to generate the endpoint-specific threat data set. In an example, the endpoint-specific threat data set may be used by one or more endpoint security system $208_{(1-M)}$ to protect against malicious messages having the one or more indicators. Threat database query engine 222 may use any of the systems and methods described herein to process the circulated threat data set to generate the endpoint-specific threat data set having the format used by the endpoint security system.

Figure 5:
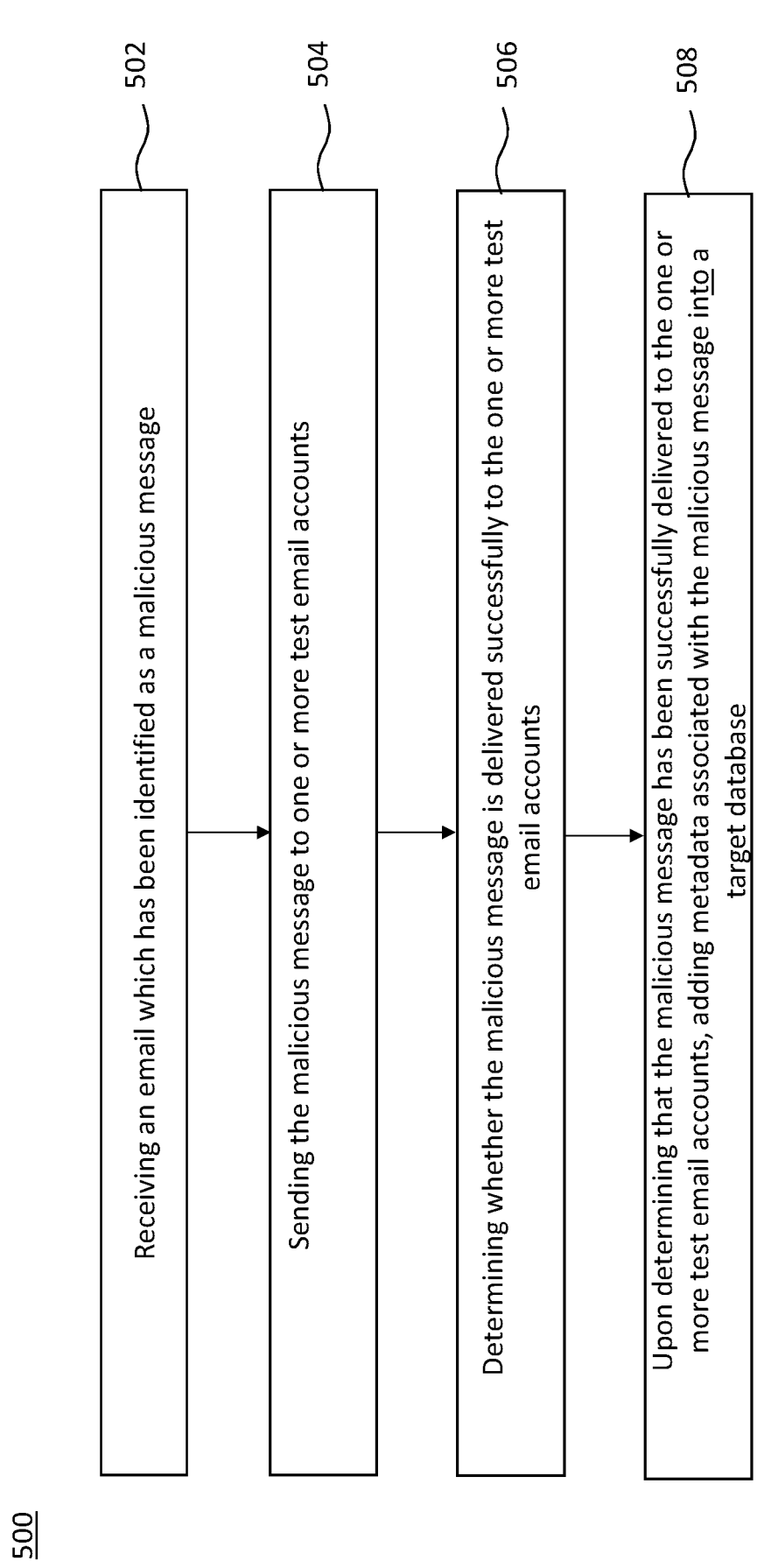
FIG. 5 depicts a flowchart for testing a malicious message against one or more test email accounts, according to some embodiments.

FIG. 5 depicts flowchart 500 for testing a malicious message against one or more test email accounts, according to some embodiments. In a brief overview of an implementation of flowchart 500, at step 502, an email that has been identified as a malicious message is received. At step 504, the malicious message is sent to one or more test email accounts. At step 506, it is determined whether the malicious message is delivered successfully to the one or more test email accounts. At step 508, upon determining that the malicious message has been successfully delivered to the one or more test email accounts, metadata associated with the malicious message is added into target database 224.

Step 502 includes receiving an email that has been identified as a malicious message. According to an implementation, threat detection platform 202 may receive an email that has been identified as a malicious message. In an example, threat detection platform 202 may receive the email that has been identified as a malicious message from threat reporting platform 210, security awareness and training platform 204, email client 244, or the security authority. Threat detection platform 202 may use any of the systems and methods described herein to receive the email that has been identified as a malicious message.

Step 504 includes sending the malicious message to one or more test email accounts. According to an implementation, threat detection platform 202 may send the malicious message to one or more test email accounts associated with one or more endpoint security systems $208_{(3-M)}$. Threat detection platform 202 may use any of the systems and methods described herein to send the malicious message to one or more test email accounts.

Step 506 includes determining whether the malicious message is delivered successfully to the one or more test email accounts. According to an implementation, threat detection platform 202 may determine whether the malicious message is delivered successfully to the one or more test email accounts. Threat detection platform 202 may use any of the systems and methods described herein to determining whether the malicious message is delivered successfully to the one or more test email accounts.

Step 508 includes adding metadata associated with the malicious message in target database 224, upon determining that the malicious message has been successfully delivered to the one or more test email accounts. In an implementation, in response to determining that the malicious message has been successfully delivered to the one or more test email accounts, threat detection platform 202 may add metadata associated with the malicious message in target database 224. Threat detection platform 202 may use any of the systems and methods described herein to add metadata associated with the malicious message in target database 224, upon determining that the malicious message has been successfully delivered to the one or more test email accounts.

The systems described above may provide multiple examples of any or each component and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising
receiving, by a determination unit of a threat detection platform executing on one or more servers, from a user of an organization, a report of a malicious message, the malicious message having traversed and evaded an endpoint security system of the organization, the determination unit configured to analyze messages reported by user to detect any cybersecurity attacks from phishing attacks via malicious messages;
identifying, by the threat detection platform executing on the one or more servers, from a threat database one or more indicators of one or more malicious elements of the malicious message;
identifying, by the threat detection platform executing on the one or more servers, an identification of the endpoint security system from one or more headers of the malicious message;
generating, by a dangerousness score calculator executing on the one or more servers, a dangerousness score of the malicious message, the dangerousness score calculator configured to determine the dangerousness score based at least on a number and severity of the one or more malicious elements that evaded the endpoint security system; and
storing, by the threat detection platform executing on the one or more servers, the one or more indicators that have evaded the endpoint security system, the identification of the endpoint security system, and the dangerousness score into the threat database that is configured to generate an endpoint-specific threat data set responsive to a query.

2. The method of claim 1, further comprising classifying, by the determination unit of the threat detection platform executing on the one or more servers, the malicious message as a threat and the classification having a level of confidence.

3. The method of claim 2, further comprising storing, by the one or more servers, the level of confidence with the one or more indicators, the identification of the endpoint security system, and the dangerousness score into the threat database.

4. The method of claim 1, further comprising determining, by the one or more servers, the identification of the endpoint security system from one or more headers of the malicious message.

5. The method of claim 1, further comprising determining, by the one or more servers, the identification of the endpoint security system from input received from a system administrator.

6. The method of claim 1, further comprising receiving, by the threat database, a query for indicators that evaded the endpoint security system and providing, by the threat database, the indicators in a format used by the endpoint security system.

7. The method of claim 1, further comprising receiving, by the threat database, a query for indicators with a minimum level of the dangerousness score for the endpoint security system and providing, by the threat database, the indicators meeting the minimum level of the dangerousness score for the endpoint security system.

8. The method of claim 1, further comprising generating from the threat database responsive to one or more queries a circulated threat data set comprising a sub-set of the threat database.

9. The method of claim 8, further comprising generating the circulated threat data set into the endpoint-specific threat data set having a format used by the endpoint security system.

10. The method of claim 1, wherein the endpoint-specific threat data set is used by one or more of the endpoint security systems to protect against malicious messages having the one or more indicators.

11. A system comprising
a threat detection platform configured on one or more servers having one or more processors, coupled to memory and configured to analyze messages reported by user to detect any cybersecurity attacks from phishing attacks via malicious messages;
  a determination unit of the threat detection platform configured to receive from a user of an organization, a report of a malicious message, the malicious message having traversed and evaded an endpoint security system of the organization;
    wherein the threat detection platform is configured to identify, from a threat database, one or more indicators of one or more malicious elements of the malicious message; and
    identify an identification of the endpoint security system from one or more headers of the malicious message;
    a dangerousness score calculator configured to generate a dangerousness score of the malicious message based at least on a number and severity of the one or more malicious elements that evaded the endpoint security system; and
  wherein the threat detection platform is configured to store one or more indicators that have evaded the endpoint security system, the identification of the endpoint security system and the dangerousness score into the threat database that is configured to generate an endpoint-specific threat data set responsive to a query.

12. The system of claim 11, wherein the determination unit of the threat detection platform configured on the one or more servers is further configured to classify the malicious message as a threat and the classification having a level of confidence.

13. The system of claim 12, wherein the one or more servers are further configured to store the level of confidence with the one or more indicators, the identification of the endpoint security system and the dangerousness score into the threat database.

14. The system of claim 11, wherein the one or more servers are further configured to determine the identification of the endpoint security system from one or more headers of the malicious message.

15. The system of claim 11, wherein the one or more servers are further configured to determine the identification of the endpoint security system from input received from a system administrator.

16. The system of claim 11, wherein the threat database is further configured to receive a query for indicators that evaded the endpoint security system and provide the indicators in a format used by the endpoint security system.

17. The system of claim 11, wherein the threat database is further configured to receive, a query for indicators with a minimum level of the dangerousness score for the endpoint security system and provide the indicators meeting the minimum level of the dangerousness score for the endpoint security system.

18. The system of claim 11, wherein the threat database is further configured to generate, responsive to one or more queries, a circulated threat data set comprising a sub-set of the threat database.

19. The system of claim 18, wherein the circulated threat data set is generated into the endpoint-specific threat data set having a format used by the endpoint security system.

20. The system of claim 11, wherein the endpoint-specific threat data set is used by one or more of the endpoint security systems to protect against malicious messages having the one or more indicators.

\* \* \* \* \*